US012383864B2

(12) United States Patent
Sakurai et al.

(10) Patent No.: US 12,383,864 B2
(45) Date of Patent: Aug. 12, 2025

(54) STABLE ISOTOPE CONCENTRATING DEVICE

(71) Applicant: TAIYO NIPPON SANSO CORPORATION, Tokyo (JP)

(72) Inventors: Hayato Sakurai, Tokyo (JP); Takashi Kambe, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 231 days.

(21) Appl. No.: 18/252,517

(22) PCT Filed: Oct. 26, 2021

(86) PCT No.: PCT/JP2021/039395
§ 371 (c)(1),
(2) Date: May 10, 2023

(87) PCT Pub. No.: WO2022/102390
PCT Pub. Date: May 19, 2022

(65) Prior Publication Data
US 2023/0405523 A1    Dec. 21, 2023

(30) Foreign Application Priority Data
Nov. 12, 2020 (JP) .................. 2020-188709

(51) Int. Cl.
*B01D 59/04* (2006.01)
(52) U.S. Cl.
CPC .................. *B01D 59/04* (2013.01)

(58) Field of Classification Search
CPC .................. B01D 3/143; B01D 59/04
See application file for complete search history.

(56) References Cited

U.S. PATENT DOCUMENTS

| 5,019,144 A | 5/1991 | Victor et al. |
| 5,197,296 A | 3/1993 | Prosser et al. |
| 6,202,440 B1 * | 3/2001 | Hayashida ............. B01D 59/04 62/919 |

(Continued)

FOREIGN PATENT DOCUMENTS

| CN | 2675635 Y | 2/2005 |
| DE | 102013018664 A1 | 4/2015 |

(Continued)

OTHER PUBLICATIONS

Extended European Search Report mailed Sep. 10, 2024 in European Application No. 21891637.7, 7 pages.

(Continued)

*Primary Examiner* — Jonathan Miller
(74) *Attorney, Agent, or Firm* — Nixon & Vanderhye P.C.

(57) ABSTRACT

The object of the present invention is to provide a stable isotope concentrating device that has high energy efficiency and can reduce equipment costs, and provides a stable isotope concentrating device including a distillation column group in which multiple distillation columns are cascaded, and the distillation column group includes: a tray column group including one or more tray columns; and a packing column group including one or more packing columns, and the packing column group is located on a secondary side of the tray column group.

7 Claims, 5 Drawing Sheets

(56) References Cited

U.S. PATENT DOCUMENTS

| | | | | |
|---|---|---|---|---|
| 6,461,583 | B1* | 10/2002 | Hayashida | B01D 59/04 |
| | | | | 202/172 |
| 6,835,287 | B1* | 12/2004 | Kihara | F25J 3/08 |
| | | | | 202/202 |
| 7,302,812 | B2* | 12/2007 | Okasinski | B01D 59/04 |
| | | | | 62/919 |
| 8,536,384 | B2* | 9/2013 | Johnston | C07C 29/76 |
| | | | | 568/885 |
| 9,194,623 | B2* | 11/2015 | Kihara | B01D 3/146 |
| 9,895,662 | B2* | 2/2018 | Kambe | C01B 5/00 |
| 2005/0044886 | A1* | 3/2005 | Okasinski | B01D 59/50 |
| | | | | 62/919 |
| 2008/0121512 | A1* | 5/2008 | Kihara | B01D 3/146 |
| | | | | 202/154 |
| 2009/0071814 | A1 | 3/2009 | Kihara et al. | |
| 2010/0025221 | A1* | 2/2010 | Agrawal | B01D 3/143 |
| | | | | 203/82 |
| 2012/0245396 | A1* | 9/2012 | Johnston | C07C 29/76 |
| | | | | 568/885 |
| 2015/0068247 | A1* | 3/2015 | Kihara | B01D 3/146 |
| | | | | 62/617 |
| 2015/0217231 | A1* | 8/2015 | Kambe | B01D 59/50 |
| | | | | 203/5 |
| 2016/0003531 | A1 | 1/2016 | Goloubev | |
| 2018/0023890 | A1 | 1/2018 | Golubev | |

FOREIGN PATENT DOCUMENTS

| | | |
|---|---|---|
| JP | 2001208469 A | 8/2001 |
| JP | 2008132418 A | 6/2008 |
| JP | 4214174 B2 | 11/2008 |
| JP | 2021109145 A | 8/2021 |
| JP | 7148419 B2 | 9/2022 |
| WO | 2007122893 A1 | 11/2007 |
| WO | WO 2014/146779 A2 | 9/2014 |
| WO | WO 2016/131545 A1 | 8/2016 |

OTHER PUBLICATIONS

B. B. McInteer et al., Isotope Separation By Distillation: Design of a Carbon-3 Plant, Separation Science and Technology, 1980, pp. 491-508, 15(3).

B.M. Andreev et al., Separation of Isotopes of Biogenic Elements in Two-phase Systems, Elsevier, 2007, 12 pages.

Tower Packings,, To-Toku Engineering Co., Ltd., 2013, 12 pages, No. 3.

International Search Report for PCT/JP2021/039395 mailed Jan. 18, 2022, 4 pages.

Written Opinion of the ISA for PCT/JP2021/039395 mailed Jan. 18, 2022, 5 pages.

* cited by examiner

STABLE ISOTOPE CONCENTRATING DEVICE

CROSS-REFERENCE TO RELATED APPLICATIONS

This application is the U.S. national phase of International Application No. PCT/JP2021/039395 filed Oct. 26, 2021, which designated the U.S. and claims priority to JP 2020-188709 filed Nov. 12, 2020, the entire contents of each of which are hereby incorporated by reference.

TECHNICAL FIELD

The present invention relates to a stable isotope concentrating device.

BACKGROUND ART

Separation methods such as thermal diffusion separation, centrifugal separation, laser separation, chemical exchange separation, and distillation separation are known as methods for separating stable isotopes that exist in nature in extremely small quantities. Among these separation methods, distillation separation is suitable for mass production of light elements, and therefore, for example, water distillation separation and oxygen distillation separation are adopted as industrial stable isotope separation methods for oxygen.

A feature of the distillation separation method for stable isotopes is that the separation factor is extremely close to 1, so several thousands of theoretical plates are required to obtain high-concentration stable isotopes. However, since there is a limit to the height of the distillation column, it is necessary to divide the distillation column into multiple columns and connect these multiple distillation columns in series (hereinafter also referred to as "cascade connection").

The distillation column mainly includes a distillation column provided with trays (hereinafter referred to as a "tray column") and a distillation column filled with packings material (hereinafter referred to as a "packing column"). Furthermore, the packing column includes two types; a structured packing column which is a column packed with structured packings and a random packing column which is a column packed with random packings.

In stable isotope concentrating devices, the random packing column is often adopted to reduce the height of the distillation column. In Patent Document 1, the oxygen isotopes are concentrated by nitric oxide distillation using the random packing column.

The random packing column has high separation performance due to the large specific surface area of the packing. In particular, in the random packing column with a small column diameter of 50 mm or less, H. E. T. P. (Height Equivalent of Theoretical Plate) is about several tens of mm (Non-Patent Document 1). Here, H. E. T. P. is an index showing the distillation performance of the packing. The smaller the value of H. E. T. P., the better the separability.

In the concentration of stable isotope using a distillation column, when increasing the product amount of stable isotope, it is necessary to increase the column diameter of the distillation column.

However, in the random packing-random packing column, when a column with a large column diameter is filled with packings with a small particle size, the pressure loss becomes very large, and the gas-liquid flow tends to be uneven. Therefore, there is generally a limit to the ratio of the column diameter of the random packing column to a particle size of the particle in the packing. As a result, the larger the column diameter of the random packing column, the smaller the specific surface area of the packing, and H. E. T. P. becomes larger. Non-Patent Document 2 describes H. E. T. P. of various random packings. According to Non-Patent Document 2, when the column diameter is 50 mm. H. E. T. P. is 15 to 60 mm, when the column diameter is 108 mm, H. E. T. P. is around 100 mm, and when the column diameter is 208 mm, the H. E. T. P. is 100 mm or more (specifically, about 150 mm to 200 mm).

On the other hand, as a method of increasing the column diameter while maintaining H. E. T. P., there is a method of dividing one distillation column into a plurality of distillation columns and connecting them in parallel (Non-Patent Document 3). However, the disadvantage of this method is that it is necessary to install either condensers or reboilers for the number of distillation columns connected in parallel. Therefore, there is a problem in that an increase in the number of condensers or reboilers increases the equipment cost and the complexity of operation management.

For the reasons above, the number of distillation columns that can be connected in parallel is limited. Therefore, in reality, if H. E. T. P. becomes large, it is necessary to design the device so that the column diameter per one column becomes large.

Therefore, in a stable isotope concentrating device using a random packing column, when the production volume is increased, the column diameter per one column increases, and the number of necessary distillation columns increases, so there is the problem of poor energy efficiency.

In addition, the random packing column is characterized by a large hold-up amount due to the large specific surface area of the packing. In the separation of stable isotopes by distillation, it is known that the start-up operation time, which is the time from the start of operation of the equipment to the start of product collection, is long. A parameter that affects the start-up operation time is a hold-up amount. Therefore, when the random packing column is used, there is also a problem in that the running cost becomes high due to the long start-up operation time.

PRIOR ART DOCUMENTS

Patent Documents

Patent Document 1: Japanese Unexamined Patent Application. First Publication No. Hei 7-148419

Non-Patent Documents

Non-Patent Document 1: B. M. Andreev, E. P. Magomedbekov, A. A. Raitman, M. B. Pozenkevich, Yu. A, Sakharovsky and A. V. Khoroshilov, "Separation of Isotopes of biogenic elements in two-phase systems", 2007

Non-Patent Document 2: To-toku enjineering Co., Ltd., TOWER PACKiNGS Catalog, No. 3

Non-Patent Document 3: B. B. McInteer, "Separation Science and Technology", 15th Edition, (3), 1980, pp 491-508

SUMMARY OF INVENTION

Problem to be Solved by the Invention

The present invention was made in view of the problems above, and an object of the present invention to provide a stable isotope concentrating device that has high energy efficiency and can reduce equipment costs.

Means for Solving the Problem

In order to achieve the objects above, the present invention employs the following configurations.

[1] A stable isotope concentrating device that concentrates stable isotopes by distillation,
wherein the stable isotope concentrating device includes a distillation column group in which multiple distillation columns are cascaded,
wherein the distillation column group includes:
a tray column group including one or more tray columns; and
a packing column group including one or more packing columns, and
wherein the packing column group is located on a secondary side of the tray column group.

[2] The stable isotope concentrating device according to [1], wherein all of the packing columns of the packing column group are random packing columns.

[3] The stable isotope concentrating device according to [1], wherein the packing column group includes one or more structured packing-structured packing columns and one or more random packing columns, and the one or more random packing columns are located on a secondary side of the one or more structured packing columns.

[4] The stable isotope concentrating device according to [1], wherein the packing column group includes one or more structured packing columns and one or more random packing columns, and the one or more structured packing columns are located on a secondary side of the one or more random packing columns.

[5] The stable isotope concentrating device according to any one of [1] to [4], wherein the distillation column to which the raw material is supplied in the distillation column group is a tray column.

[6] The stable isotope concentrating device according to any one of [2] to [5], wherein the number of the random packing columns connected in parallel in the random packing column group is 20 or less.

[7] The stable isotope concentrating device according to any one of [2] to [6], wherein the random packing column has a column diameter of 200 mm or less.

Effects of the Invention

The stable isotope concentrating device of the present invention has high energy efficiency and can reduce equipment costs.

DETAILED DESCRIPTION OF THE PREFERRED EMBODIMENTS

Figure 1:
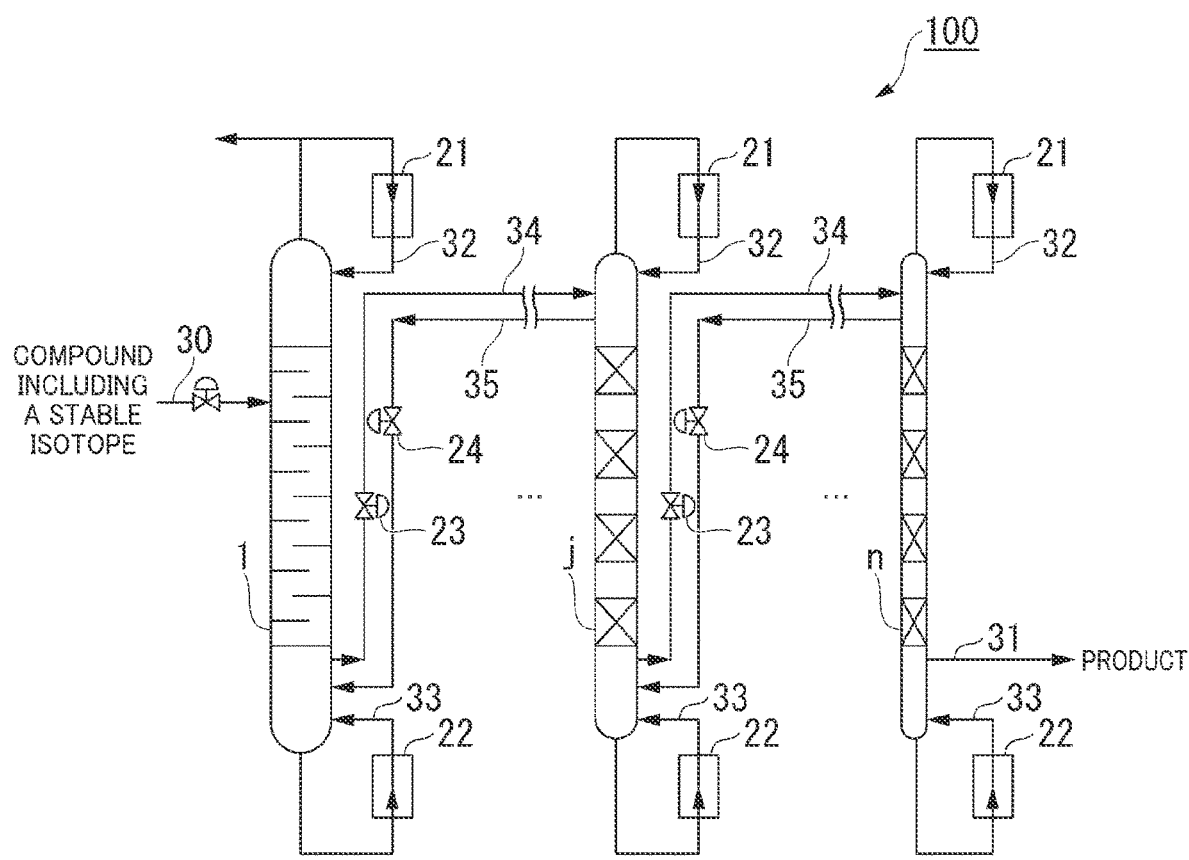
FIG. 1 is a system diagram showing a main part of a stable isotope concentrating device according to an embodiment of the present invention.

Hereinafter, the present invention will be described in detail by showing embodiments with reference to the accompanying drawings.

In addition, in the drawings used in the following explanation, in order to make the features easier to understand, the characteristic portions may be enlarged for convenience, and the dimensional ratios of each component may not necessarily be the same as the actual ones.

<Stable Isotope Concentrating Device>

FIG. 1 is a system diagram showing a main part of a stable isotope concentrating device according to an embodiment of the present invention. A stable isotope concentrating device 100 of the present embodiment includes a distillation column group in which a plurality of distillation columns are cascaded, a plurality of condensers 21, a plurality of reboilers 22, a raw material feed line 30 and a product line 31.

Hereinafter, the n-th distillation column from the upstream end of the distillation column group is referred to as the n-th distillation column.

A 1st distillation column 1 to the n-th distillation column n are cascade-connected in the order of column numbers.

The 1st distillation column 1 to the n-th distillation column n distill cooled stable isotopes at low temperature, and concentrate stable isotopes with a low boiling point on the top side of the column and stable isotopes with a high boiling point on the bottom side of the column.

Among the 1st distillation column 1 to the n-th distillation column n, the 1st distillation column 1 to which the raw material is supplied has the largest column diameter, and the column diameter gradually decreases toward the end.

The 1st distillation column 1 to the (j−1)-th distillation column j−1 are tray columns, and the j-th distillation column j to the n-th distillation column n are packing columns.

There are three possible configurations for the packing column group. Specifically, the three possible configurations are all random packing columns, the random packing columns are located on the secondary side of structured packing columns, and the structured packing columns are located on the secondary side of random packing columns.

FIG. 1 only shows, among the 1st distillation column 1 to the n-th distillation column n, a 1st distillation column 1 which is a tray column and a column in which the raw material stable isotopes are supplied, a j-th distillation column, which is the 1st column to change from the tray column to the packing column, and a n-th distillation column n, which is the column from which the product is collected.

Also, for convenience of drawing, FIG. 1 shows a case in which only one distillation column in the random packing columns connected in parallel and one condenser and one reboiler are provided in one distillation column.

As described in the background art, in the case of the random packing column, if the column diameter is large, H. E. T. P. becomes larger.

On the other hand, in the case of the tray column used in an air separation unit, and the like, the interval between trays is generally about 100 mm.

Therefore, since the random packing column has H. E. T. P. of more than 100 mm, the height of the distillation column can be suppressed by using a tray column together. As a result, the number of distillation columns can be reduced, so that energy efficiency can be improved. Specifically, when the column diameter of the random packing column exceeds 200 mm, it is preferable to employ a tray column together. Furthermore, it is more preferable that the column diameter of the random packing column be 100 mm or less.

The random packing column has a large hold-up amount. In addition, the tray column has a liquid layer at each stage, so the amount of hold-up is also large.

On the other hand, the structured packing column generally has a small hold-up amount and can shorten the start-up operation time. The start-up operation time means the time until the concentration distribution is formed in the entire distillation column group. The effect of the hold-up amount on the start-up operation time becomes greater the closer to the "column from which the product is collected", in which the concentration degree from the natural abundance ratio is high.

"Mellapack", manufactured by Sulzer Chemtech, is one of the structured packings that are often used in air separation equipment. H. E. T. P. thereof with a large specific surface area is about 150 mm to about 250 mm.

In a stable isotope concentrating device by distillation, the column diameter decreases from the upstream column to which the raw material is supplied to the downstream column which collects products, and most of the energy required is consumed by the upstream distillation columns.

Therefore, in columns close to the product collection column, the number of distillation columns increases by adopting a structured packing column, but the start-up operation time can be greatly shortened. Also, since the column diameter of the increased distillation column is small, the drop in energy efficiency can be minimized.

Therefore, in the stable isotope concentrating device 100 of the present embodiment, among the cascaded distillation column groups, the tray column is adopted at least as the column to which the raw material is suppled, and the packing columns filled with the packing are adopted as columns other than the tray column.

The packing column group has the following three configurations depending on the design conditions such as energy efficiency and start-up operation time.
(1) All distillation columns in the packing column group are random packing columns.
(2) The packing column group includes one or more structured packing columns and one or more random packing columns, and the one or more random packing columns are located on the secondary side of the one or more structured packing columns.
(3) The packing column group includes one or more structured packing columns and one or more random packing columns, and the one or more structured packing columns are located on the secondary side of the one or more random packing columns.

The interval between trays is preferably about 100 mm, and more preferably narrower than H. E. T. P. of the random packing.

Specifically, as described above, the 1st distillation column 1 to the (j−1)-th distillation column j−1 are tray columns, and the j-th distillation column j to n-th distillation column n are packing columns. That is, the stable isotope concentrating device 100 of the present embodiment includes a tray column group including one or more tray columns (1st distillation column 1 to (j−1)-th distillation column j−1), and a packing column group including one or more packing columns (j-th distillation column j to n-th distillation column n).

The packing column group is located on the secondary side of the tray column group, and the packing column group may have any of the three configurations above according to design conditions.

The tray column group includes the 1st distillation column 1 to which the raw material is supplied. The packing column group includes the n-th distillation column n from which the product is collected (derived).

It should be noted that it is not always necessary to supply the raw material into the 1st distillation column 1, and the 1st distillation column, which serves as a recovery section, may be positioned before the column to which the raw material is supplied. Also, the column from which the product is collected does not necessarily have to be the last column (n-th distillation column n), and may be in the middle of the distillation column group.

In the stable isotope concentrating device 100 of the present embodiment, it is possible to increase the corresponding column diameter while maintaining high H. E. T. P. by connecting random packing columns in parallel.

In random packing columns connected in parallel, the same number of either the condenser or the reboiler can be installed as the number of columns connected in parallel, and only one unit of the other can be installed as a common device.

The number of random packing columns connected in parallel is preferably 20 or less, more preferably less than 10, in order to reduce equipment costs and enable stable device operation.

One or more condensers 21 are provided for each distillation column (1st distillation column 1 to n-th distillation column n). The condenser 21 is provided in a circulation line 32 of which ends are connected at different positions on the top of each distillation column. The condenser 21 has a function of liquefying gas that has ascended in the distillation column by exchanging heat and causing it to descend again in the distillation column.

One or more reboilers 22 are provided for each distillation column. The reboiler 22 is provided in a circulation line 33 of which ends are connected at different positions on the bottom of each distillation column. The reboiler 22 has a function of exchanging heat with liquid that has descended in the distillation column to vaporize it and ascend the liquid in the distillation column again.

One end of the raw material feed line 30 is connected to the middle portion of the 1st distillation column 1. The raw material feed line 30 is a path for feeding the stable isotopes to the middle portion of the 1st distillation column 1. A valve is provided in the raw material supply line 30.

The middle portion of the distillation column refers to a position other than the top and bottom of the distillation column.

The purity of the stable isotope supplied from the raw material supply line 30 is preferably as high as 99.999% or higher.

With the exception of the last distillation column, a portion of vapor at the bottom in each distillation column which is concentrated in stable isotope with a high boiling point is supplied to the top of the next distillation column by a line 34 via a valve 23. The driving force of the flow is the pressure difference between the bottom of one distillation column and the top of the next distillation column. The vapor supplied to the top of the next distillation column is liquefied by the condenser 21 together with the ascending vapor in the distillation column, and is returned to the top of the distillation column.

In addition, with the exception of the 1st distillation column 1, a part of the reflux liquid near the top of each distillation column which is concentrated in stable isotope with a low boiling point is supplied to the bottom of the previous column by the line 34 via a valve 24. The driving force of flow is the head pressure of the reflux liquid. The reflux liquid supplied to the bottom of the previous column is vaporized in the reboiler 22 together with the reflux liquid in the distillation column, and is refluxed to the bottom of the distillation column.

The product line 31 is a path for leading out the concentrated stable isotope component as a product from the n-th distillation column n. One end of the product line 31 is connected to a part near the bottom of the n-th distillation column n. The product is a stable isotope ingredient concentrated to a high concentration (e.g., 99% or more).

As described above, the stable isotope concentrating device 100 of the present embodiment has the tray column group including one or more tray columns, and the packing column group including one or more packing columns, and the packing column group is located on the secondary side of the tray column group. As a result, the stable isotope concentrating device 100 of the present embodiment has high energy efficiency and can reduce equipment costs.

Furthermore, the stable isotope concentrating device 100 of the present embodiment has an excellent balance between energy efficiency and start-up operation time.

Moreover, in the stable isotope concentrating device 100 of the present embodiment, when the column diameter of the random packing column is 200 mm or less, and when the column diameter of the random packing column exceeds 200 mm, the tray column is adopted. As a result, the height of the distillation column can be reduced, further increasing energy efficiency.

In addition, in the present invention, when the column diameter of the random packing column is about 100 to 200 mm, a tray column or a structured packing column may be adopted instead of the random packing column. When the tray column is adopted, the height of the distillation column can be suppressed similarly to the stable isotope concentrating device 100 of this embodiment, resulting in high energy efficiency.

On the other hand, the tray column has a larger hold-up amount compared to that of the random packing column when the particle size of the random packing is large (the specific surface area of the packing is small). In this case, the start-up operation time is extended.

When the column diameter of the random packing column is about 200 mm, H. E. T. P. is equivalent to that of the structured packing column filled with a packing having a large specific surface area. When the structured packing column is adopted, the energy efficiency is the same, but the start-up operation time can be shortened.

Also, if the column diameter of the random packing column is less than 100 mm, the structured packing column may be adopted if it is a column near the column from which the product is collected, including the column from which the product is collected. The columns near the column from which the product is collected have a small column diameter, and the ratio of the energy required for operation to the total energy is small. Therefore, the decrease in energy efficiency is small, and the startup operation time can be greatly shortened.

Furthermore, in the stable isotope concentrating device 100 of the present embodiment, the number of the random packing columns connected in parallel is 20 or less, so the equipment cost can be further reduced.

Although the stable isotope concentrating device of the present invention has been described above by showing embodiments, the present invention is not limited to these embodiments. Each configuration and combination thereof in the embodiment above are examples, and addition, omission, replacement, and other modifications of the configuration are possible without departing from the scope of the present invention.

EXAMPLES

The present invention will be described in detail below with reference to Examples, but the present invention is not limited to the following examples.

Example 1

Figure 2:
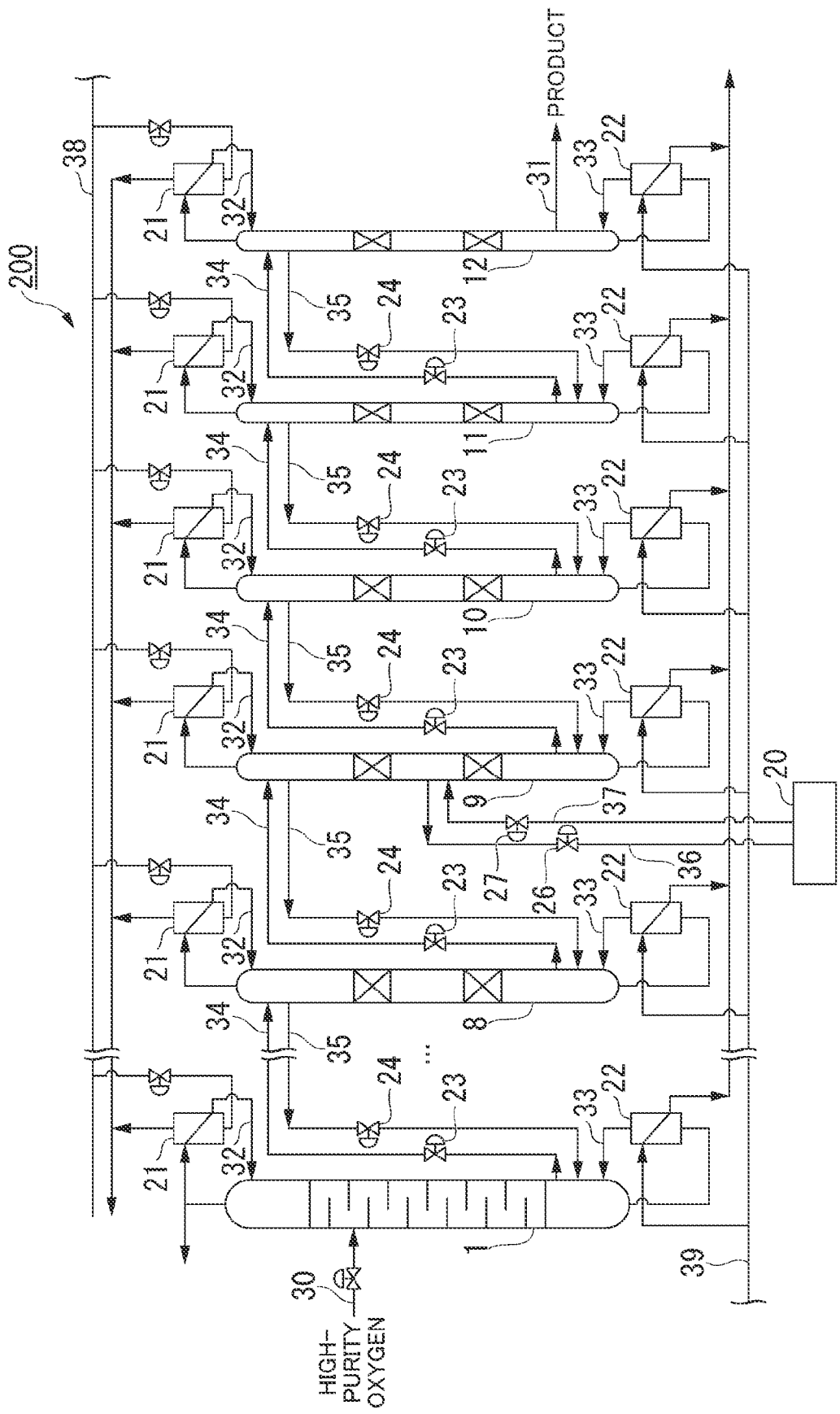
FIG. 2 is a system diagram showing a main part of an oxygen stable isotope concentrating device used in Example 1.

In Example 1, a stable isotope concentrating device 200 shown in FIG. 2 was used to concentrate ISO.

The stable isotope concentrating device 200 has basically the same configuration as that of the stable isotope concentrating device 100. The distillation column group includes 12 distillation columns, a 1st distillation column 1 is a tray column, a 2nd distillation column 2 to a 12th distillation column 12 are random packing columns. Liquid nitrogen was used as a cold source for the condenser 21, and the liquid nitrogen was supplied to each condenser 21 from a liquid nitrogen supply line 38. Nitrogen gas was used as a heat source for the reboilers 22, and the nitrogen gas was supplied to each reboiler 22 from a nitrogen gas supply line 39. Also, the stable isotope concentrating device 200 is provided with an isotope scrambler 20. An isotope-concentrated gas lead-out line 36 has one end connected to the middle portion of the 9th distillation column 9 and the other end connected to the isotope scrambler 20 in order to lead out some or all of the oxygen and supply the oxygen into the isotope scrambler 20. The oxygen that has undergone the isotope exchange reaction in the isotope scrambler 20 is returned to the middle portion of the 9th distillation column 9 through an isotope-concentrated gas return line 37.

The composition of the raw material high-purity oxygen to be supplied was as shown in Table 1.

The interval of the trays in the 1st distillation column 1 was 100 mm.

In the 2nd distillation column 2 to the sixth distillation column 6, the column diameter per one distillation column was in the range of 100 to 200 mm.

In the 7th distillation column 7 to the 12th distillation column 12, the column diameter per one distillation column was 100 mm or less.

In the 2nd distillation column 2 to the 8th distillation column 8, random packing columns were connected in parallel. In the 2nd distillation column 2 to the 8th distillation column 8, the same number of condensers as that of the distillation columns connected in parallel were provided, and one reboiler was provided as a common device in the distillation columns.

The number of distillation columns connected in parallel was 20 or less in any distillation column group.

TABLE 1

| Molecule including stable isotope | Molecular weight | Natural abundance |
|---|---|---|
| $^{16}O_2$ | 32 | 99.5% |

TABLE 1-continued

| Molecule including stable isotope | Molecular weight | Natural abundance |
|---|---|---|
| $^{16}O^{17}O$ | 33 | 758 ppm |
| $^{16}O^{18}O$ | 34 | 4090 ppm |
| $^{17}O_2$ | 34 | 0.1 ppm |
| $^{17}O^{18}O$ | 35 | 1.6 ppm |
| $^{18}O_2$ | 36 | 4.2 ppm |

Table 2 shows the abundance of molecules including a stable isotope in the oxygen gas led out from the bottom of the 12th distillation column 12 when the apparatus is stable.

Also, the total heat exchange capacity of the condenser and the reboiler was 815 kW. The start-up operation time of the device was about 270 days.

TABLE 2

| Molecule including stable isotope | Molecular weight | Abundance [%] |
|---|---|---|
| $^{16}O_2$ | 32 | 0.0 |
| $^{16}O^{17}O$ | 33 | 0.0 |
| $^{16}O^{18}O$ | 34 | 1.8 |
| $^{17}O_2$ | 34 | 0.0 |
| $^{17}O^{18}O$ | 35 | 1.8 |
| $^{18}O_2$ | 36 | 96.4 |

Comparative Example 1

Figure 3:
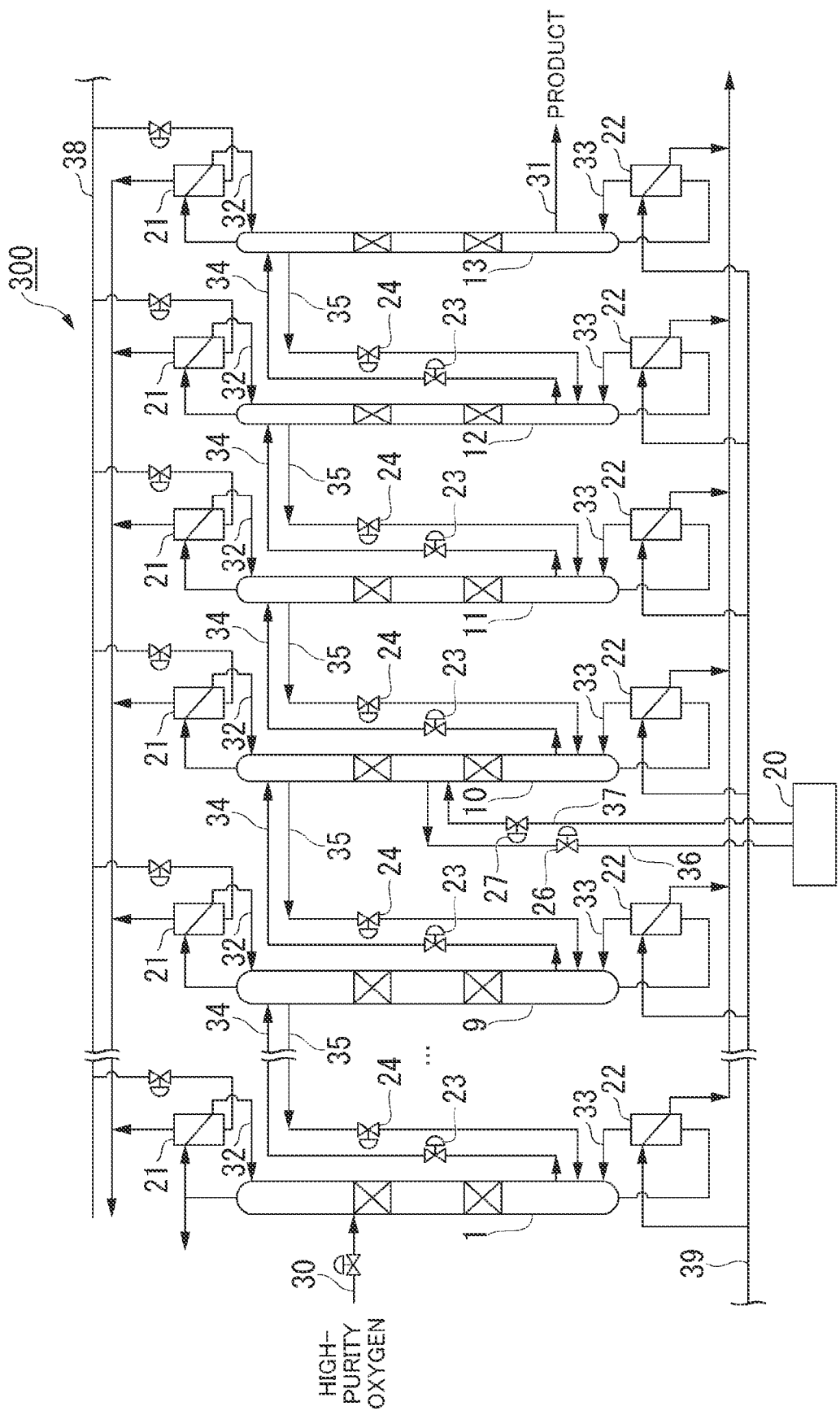
FIG. 3 is a system diagram showing a main part of an oxygen stable isotope concentrating device used in Comparative Example 1.

In Comparative Example 1, a stable isotope concentrating device 300 shown in FIG. 3 was used to concentrate $^{18}O$.

The stable isotope concentrating device 300 has basically same configuration as that of the stable isotope concentrating device 200 except that the number of the distillation columns is 13 and the 1st distillation column 1 is a packing column filled with random packing. The isotope scrambler 20 was connected to the middle portion of the tenth distillation column 10.

The composition of the raw material high-purity oxygen to be supplied was as shown in Table 1.

In the 1st distillation column 1, the column diameter per one distillation column was 200 mm or more.

In the 2nd distillation column 2 to the 13th distillation column 13, the column diameter per one distillation column was 200 mm or less.

In the 1st distillation column 1 to the 9th distillation column 9, random packing columns were connected in parallel. In the 1st distillation column 1 to the 9th distillation column 9, the same number of the condensers as that of the distillation columns connected in parallel were provided in each distillation column, and one reboiler was provided as a common device.

The number of distillation columns connected in parallel was 20 or less in any distillation column group.

Table 3 shows the abundance of molecules including a stable isotope in the oxygen gas led out from the bottom of the 13th distillation column 13 when the apparatus is stable.

Also, the total heat exchange capacity of the condenser and the reboiler was 1570 kW. The start-up operation time of the device was about 270 days.

TABLE 3

| Molecule including stable isotope | Molecular weight | Abundance [%] |
|---|---|---|
| $^{16}O_2$ | 32 | 0.0 |
| $^{16}O^{17}O$ | 33 | 0.0 |
| $^{16}O^{18}O$ | 34 | 1.3 |
| $^{17}O_2$ | 34 | 0.0 |
| $^{17}O^{18}O$ | 35 | 1.9 |
| $^{18}O_2$ | 36 | 96.8 |

From the results above, in Example 1, the required heat exchange amount could be reduced by about 50% compared to Comparative Example 1, and the required number of the distillation columns could be reduced by 1 column. Moreover, in Example 1, it was possible to use only one condenser in the 1st distillation column 1.

Therefore, it was found that the stable isotope concentrating device of the present invention has high energy efficiency and can reduce equipment costs.

In addition, in Example 1, one or more of the 2nd distillation column 2 to the 6th distillation column 6 may be a structured packing column. In this case, the total amount of heat exchange is approximately the same as that in Example 1, and the number of condensers in the 2nd distillation column 2 to the 6th distillation column 6 could be reduced to only one. In addition, since the hold-up amount was small, it is expected that the start-up operation time will be shortened.

Example 2

Figure 4:
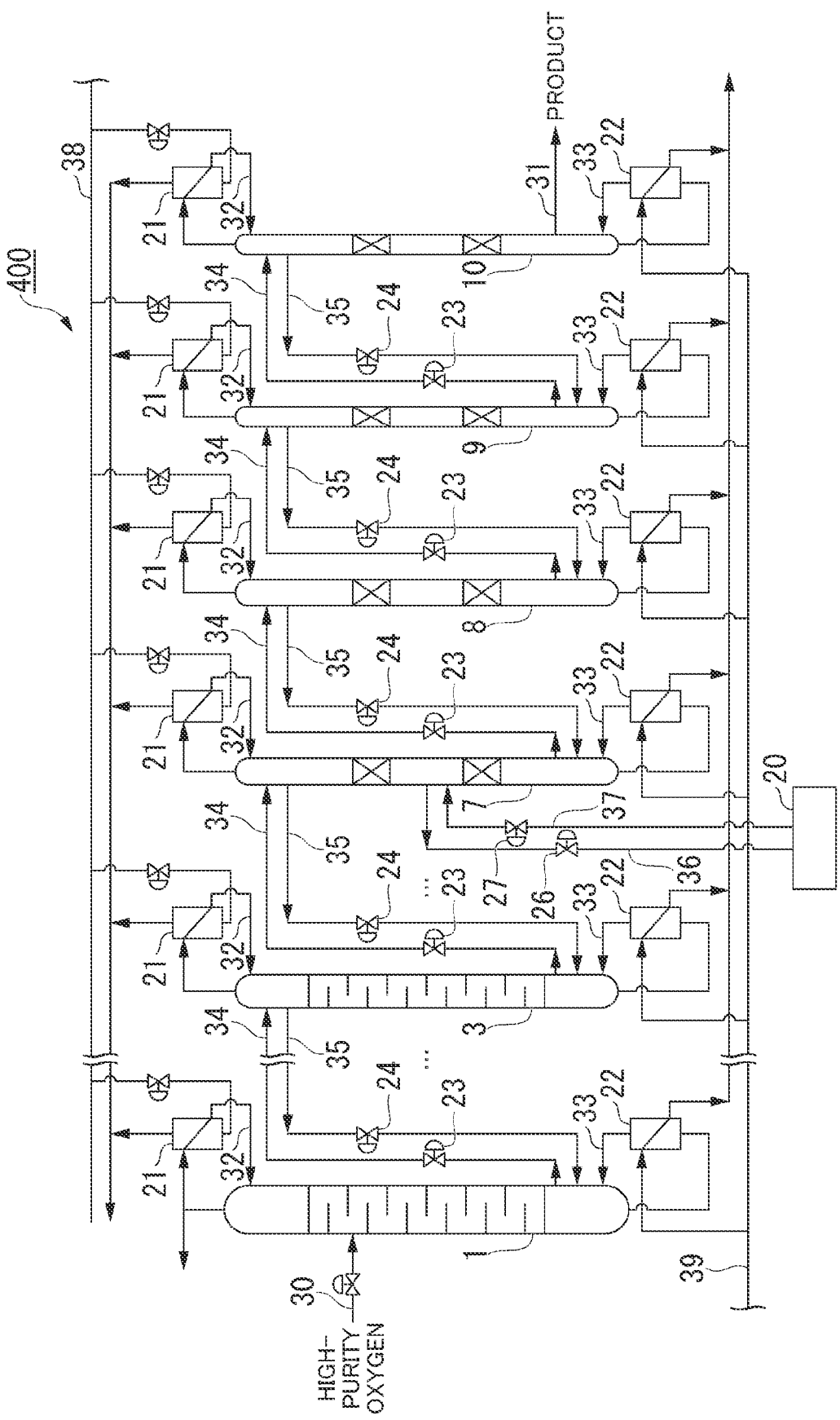
FIG. 4 is a system diagram showing a main part of an oxygen stable isotope concentrating device used in Example 2.

In Example 2, a stable isotope concentrating device 400 shown in FIG. 4 was used to concentrate $^{18}O$.

The stable isotope concentrating device 400 has 10 distillation columns, the 1st distillation column 1 to the 3rd distillation column 3 are tray columns, and the 4th distillation column 4 to the 10th distillation column 10 are random packing columns. The stable isotope concentrating device 400 has substantially the same configuration as that of the stable isotope concentrating device 200 except that the total number of distillation columns, the number of the tray columns, and the number of the packing columns are different. The isotope scrambler 20 was connected to the middle portion of the 7th distillation column 7.

The composition of the raw material high-purity oxygen to be supplied was as shown in Table 1.

The interval of the trays in the 1st distillation column 1 to the 3rd distillation column 3 was 100 mm.

In the 4th distillation column 4 to the 10th distillation column 10, the column diameter per one distillation column was 100 mm or less.

In the 4th distillation column 4 to the 6th distillation column 6, random packing columns were connected in parallel. In the 4th distillation column 4 to the 6th distillation column 6, the same number of the condensers as that of the distillation columns connected in parallel were provided, and one reboiler was provided as a common device.

The number of distillation columns connected in parallel was 10 or less in any distillation column group.

Table 4 shows the abundance of molecules including a stable isotope in the oxygen gas led out from the bottom of the 10th distillation column 10 when the apparatus is stable.

Also, the total heat exchange capacity of the condenser and reboiler was 640 kW.

TABLE 4

| Molecule including stable isotope | Molecular weight | Abundance [%] |
|---|---|---|
| $^{16}O_2$ | 32 | 0.0 |
| $^{16}O^{17}O$ | 33 | 0.0 |
| $^{16}O^{18}O$ | 34 | 1.6 |
| $^{17}O_2$ | 34 | 0.0 |
| $^{17}O^{18}O$ | 35 | 1.7 |
| $^{18}O_2$ | 36 | 96.7 |

From the results above, it was found that increasing the number of the tray columns further increases the energy efficiency and reduces the number of the distillation columns and the number of the condensers, thus reducing the facility cost.

On the other hand, in Example 2, when changing the 4th distillation column 4 from the random packing column to the tray column, the required length of the distillation column becomes longer, and it is necessary to increase the number of distillation columns. Therefore, there is no advantage to changing from a random packing column to a tray column.

Example 3

Figure 5:
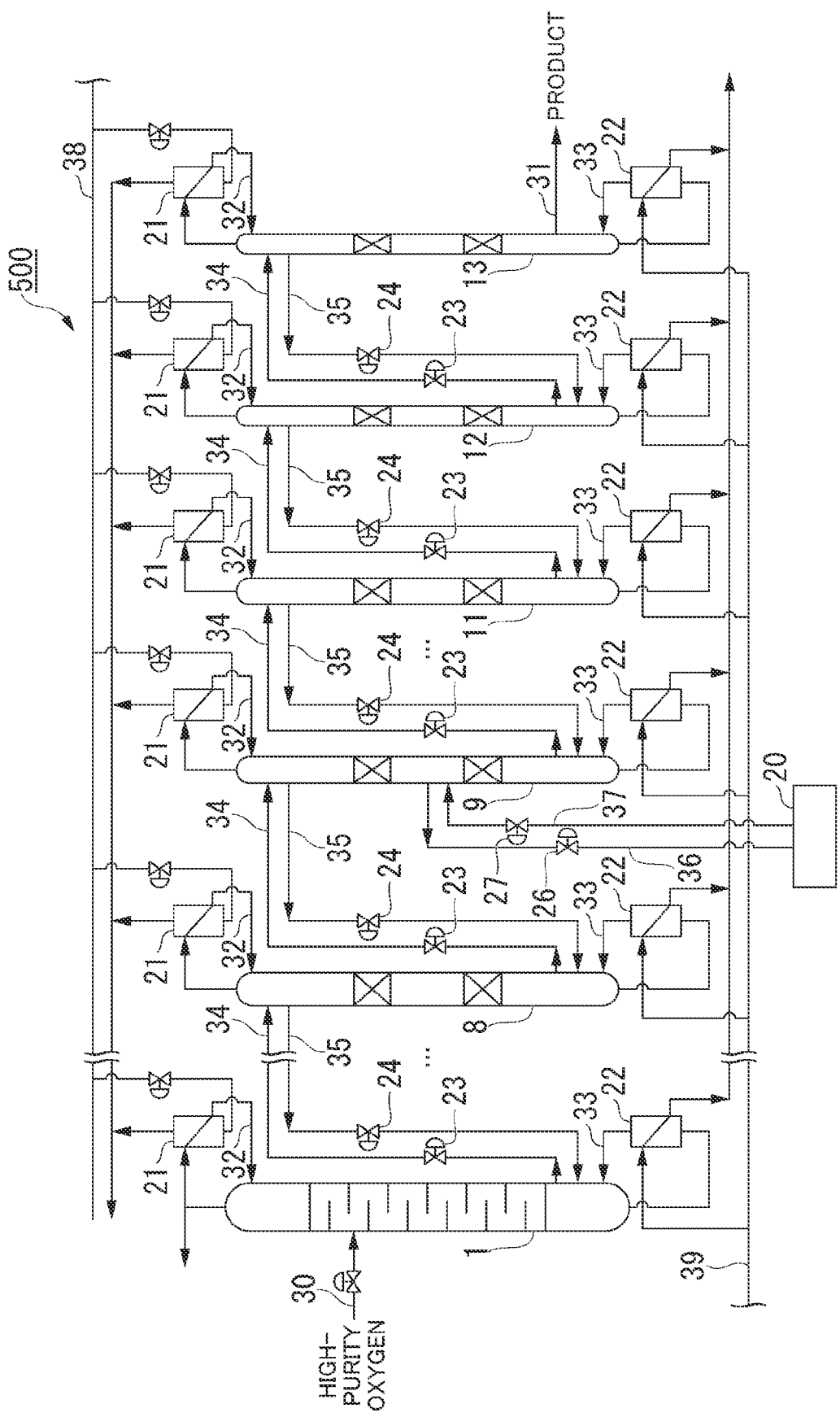
FIG. 5 is a system diagram showing a main part of an oxygen stable isotope concentrating device used in Example 3.

In Example 3, a stable isotope concentrating device 500 shown in FIG. 5 was used to concentrate $^{18}O$.

The stable isotope concentrating device 500 has 13 distillation columns. The 1st distillation column 1 is a tray column. The 2nd distillation column 2 to the 11th distillation column 11 were random packing columns, and the 12th distillation column 12 and 13th distillation column 13 were structured packing columns. The stable isotope concentrating device 500 has substantially the same configuration as that of the stable isotope concentrating device 200 except that the total number of the distillation columns, the number of the tray columns, and the number of the packing columns are different. The isotope scrambler 20 was connected to the middle portion of the 9th distillation column 9.

The composition of the raw material high-purity oxygen to be supplied was as shown in Table 1.

The interval of the trays in the 1st distillation column 1 was 100 mm.

In the 2nd distillation column 2 to the 11th distillation column 11, the column diameter per one distillation column was 200 mm or less.

H. E. T. P. of the 12th distillation column 12 and the 13th distillation column 13 was 200 mm.

In the 2nd distillation column 2 to the 8th distillation column 8, random packing columns were connected in parallel. In the 2nd distillation column 2 to the 8th distillation column 8, the same number of the condensers as that of the distillation columns connected in parallel were provided, and one reboiler was provided as a common device.

The number of distillation columns connected in parallel was 20 or less in any distillation column group.

Table 5 shows the abundance of molecules including a stable isotope in the oxygen gas led out from the bottom of the 13th distillation column 13 when the apparatus is stable.

Also, the total heat exchange capacity of the condenser and reboiler was 817 kW. The start-up operation time of the device was about 250 days.

TABLE 5

| Molecule including stable isotope | Molecular weight | Abundance [%] |
|---|---|---|
| $^{16}O_2$ | 32 | 0.0 |
| $^{16}O^{17}O$ | 33 | 0.0 |
| $^{16}O^{18}O$ | 34 | 1.7 |
| $^{17}O_2$ | 34 | 0.0 |
| $^{17}O^{18}O$ | 35 | 1.8 |
| $^{18}O_2$ | 36 | 96.5 |

From the results above, in Example 3, by using a structured packing column as distillation columns near the column from which the product is collected, the amount of heat exchange is about the same as that in Example 1, and the start-up operation time is reduced by about 20 days compared with Example 1.

Therefore, it was found that the stable isotope concentrating device of the present invention has an excellent balance between energy efficiency and start-up operation time.

The results above can be obtained not only for oxygen but also for other stable isotopes. For example, even in stable isotope concentrating carbon, hydrogen, and nitrogen, the stable isotope concentrating device of the present invention has high energy efficiency and reduces equipment cost.

INDUSTRIAL APPLICABILITY

The present invention relates to a distillation device including a distillation column group in which a plurality of distillation columns are cascaded, and is used as a stable isotope concentrating device for concentrating stable isotope atoms that exist very rarely in nature.

EXPLANATION OF REFERENCE NUMERALS 1 to n distillation column
20 isotope scrambler
21 condenser
22 reboiler
23, 24 valve
30 raw material feed line
31 product line
32, 33 circulation line
36 isotope-concentrated gas lead-out line
37 isotope-concentrated gas return line
38 liquefied nitrogen supply line
39 nitrogen gas supply line
100, 200, 300, 400, 500 stable isotope concentrating devices

The invention claimed is:
1. A stable isotope concentrating device that concentrates stable isotopes by distillation,
wherein the stable isotope concentrating device comprises a distillation column group in which multiple distillation columns are cascaded,
wherein the distillation column group comprises:
a tray column group comprising one or more tray columns; and
a packing column group comprising one or more packing columns, and
wherein the packing column group is located on a secondary side of the tray column group.
2. The stable isotope concentrating device according to claim 1, wherein all of the packing columns of the packing column group are random packing columns.

3. The stable isotope concentrating device according to claim 1,
wherein the packing column group comprises one or more structured packing columns and one or more random packing columns, and the one or more random packing columns are located on a secondary side of the one or more structured packing columns.

4. The stable isotope concentrating device according to claim 1,
wherein the packing column group comprises one or more structured packing columns and one or more random packing columns, and the one or more structured packing columns are located on a secondary side of the one or more random packing columns.

5. The stable isotope concentrating device according to claim 1,
wherein the distillation column to which the raw material is supplied in the distillation column group is a tray column.

6. The stable isotope concentrating device according to claim 2,
wherein the number of the random packing columns connected in parallel in the random packing column group is 20 or less.

7. The stable isotope concentrating device according to claim 2, wherein the random packing column has a column diameter of 200 mm or less.

* * * * *